United States Patent
Park et al.

(10) Patent No.: US 10,749,231 B2
(45) Date of Patent: Aug. 18, 2020

(54) METAL-AIR BATTERY HAVING FOLDED STRUCTURE AND METHOD OF MANUFACTURING THE SAME

(71) Applicant: Samsung Electronics Co., Ltd., Suwon-si, Gyeonggi-do (KR)

(72) Inventors: Min-sik Park, Hwaseong-si (KR); Tae-young Kim, Seoul (KR); Dong-joon Lee, Yongin-si (KR); Sang-bok Ma, Suwon-si (KR); Dong-min Im, Seoul (KR); Victor Roev, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/170,141

(22) Filed: Oct. 25, 2018

(65) Prior Publication Data

US 2019/0067767 A1 Feb. 28, 2019

Related U.S. Application Data

(60) Division of application No. 15/335,645, filed on Oct. 27, 2016, now Pat. No. 10,141,619, which is a
(Continued)

(30) Foreign Application Priority Data

Nov. 18, 2013 (KR) ........................ 10-2013-0140083

(51) Int. Cl.
*H01M 8/22* (2006.01)
*H01M 12/08* (2006.01)
(Continued)

(52) U.S. Cl.
CPC ............ *H01M 12/08* (2013.01); *H01M 2/162* (2013.01); *H01M 2/1666* (2013.01); *H01M 2/18* (2013.01);
(Continued)

(58) Field of Classification Search
CPC .... H01M 12/04; H01M 12/06; H01M 12/065; H01M 12/08; H01M 12/02; H01M 2/162;
(Continued)

(56) References Cited

U.S. PATENT DOCUMENTS 3,772,089 A * 11/1973 Bennett ............. H01M 10/0413
29/623.2
8,871,394 B1 * 10/2014 Garcia ............. H01M 10/0422
429/403

(Continued)

FOREIGN PATENT DOCUMENTS

JP 2003-100350 A 4/2003
JP 20100129360 A 6/2010
(Continued)

OTHER PUBLICATIONS

Korean Office Action for Korean Patent Application No. 10-2013-0140083 dated Mar. 29, 2020.

*Primary Examiner* — Raymond Alejandro
(74) *Attorney, Agent, or Firm* — Cantor Colburn LLP

(57) ABSTRACT

A metal-air battery including: a negative electrode metal layer; a negative electrode electrolyte layer disposed on the negative electrode metal layer; a positive electrode layer disposed on the negative electrode electrolyte layer, the positive electrode layer comprising a positive electrode material which is capable of using oxygen as an active material; and a gas diffusion layer disposed on the positive electrode layer, wherein the negative electrode electrolyte layer is between the negative electrode metal layer and the
(Continued)

positive electrode layer; wherein the negative electrode metal layer, the negative electrode electrolyte layer, and the positive electrode layer are disposed on the gas diffusion layer so that the positive electrode layer contacts a lower surface and an opposite upper surface of the gas diffusion layer, and wherein one side surface of the gas diffusion layer is exposed to an outside.

11 Claims, 10 Drawing Sheets

Related U.S. Application Data continuation of application No. 14/310,572, filed on Jun. 20, 2014, now Pat. No. 9,509,027.

(51) Int. Cl.
  *H01M 12/06*    (2006.01)
  *H01M 6/18*    (2006.01)
  *H01M 2/18*    (2006.01)
  *H01M 2/16*    (2006.01)
  *H01M 12/02*    (2006.01)
  *H01M 10/04*    (2006.01)
  *H01M 4/02*    (2006.01)

(52) U.S. Cl.
  CPC .......... *H01M 6/187* (2013.01); *H01M 10/045* (2013.01); *H01M 12/02* (2013.01); *H01M 12/06* (2013.01); *H01M 10/0454* (2013.01); *H01M 2004/025* (2013.01); *Y02E 60/128* (2013.01); *Y10T 29/49115* (2015.01)

(58) Field of Classification Search
  CPC .... H01M 2/1666; H01M 2/18; H01M 10/045; H01M 10/0454; H01M 6/187; H01M 2004/025; Y02E 60/128; Y10T 29/49115
  See application file for complete search history.

(56) References Cited

U.S. PATENT DOCUMENTS

| | | | |
|---|---|---|---|
| 9,509,027 B2 | 11/2016 | Park | ................ H01M 12/06 |
| 2010/0119919 A1* | 5/2010 | Iarochenko | ......... H01M 2/0207 |
| | | | 429/405 |
| 2010/0285375 A1 | 11/2010 | Friesen et al. | |
| 2011/0236799 A1* | 9/2011 | Burchardt | ........... H01M 2/1653 |
| | | | 429/534 |

FOREIGN PATENT DOCUMENTS

| | | |
|---|---|---|
| JP | 2012527090 A | 11/2012 |
| JP | 2013-051169 A | 3/2013 |
| KR | 1020000073463 A | 12/2000 |

* cited by examiner

METAL-AIR BATTERY HAVING FOLDED STRUCTURE AND METHOD OF MANUFACTURING THE SAME

RELATED APPLICATIONS

This application is a divisional of U.S. patent application Ser. No. 15/335,645, filed on Oct. 27, 2016, which is a continuation of U.S. patent application Ser. No. 14/310,572, filed on Jun. 20, 2014, which claims priority to and the benefit of Korean Patent Application No. 10-2013-0140083, filed on Nov. 18, 2013, in the Korean Intellectual Property Office, and all the benefits accruing therefrom under 35 U.S.C. § 119, the content of which is incorporated herein in its entirety by reference.

BACKGROUND

1. Field

The present disclosure relates to a metal-air battery and a method of manufacturing the same, and more particularly, to a metal-air battery having increased energy density, and a method of manufacturing the same.

2. Description of the Related Art

A metal-air battery includes a negative electrode capable of occluding and emitting ions and a positive electrode in which oxygen in the air is used as an active material. In the metal-air battery, reduction and oxidation reactions of oxygen received from the outside occur in the positive electrode, oxidation and reduction reactions of the metal occur in the negative electrode, and chemical energy generated then is extracted as electrical energy. For example, the metal-air battery absorbs oxygen during discharge and emits oxygen during charge. As described above, since the metal-air battery uses oxygen in the air, energy density of the metal-air battery may be significantly greater than that of other batteries. For example, the metal-air battery may have an energy density several times higher than that of a conventional lithium ion battery.

In addition, since the metal-air battery has a low probability of ignition caused by an abnormally high temperature, the metal-air battery has high stability and, since the metal-air battery is operated by only absorption and emission of oxygen without using a heavy metal, there is a low probability of the metal-air battery contaminating the environment. Due to such various advantages, much research into the metal-air battery is currently being performed, and the remains a need for improved metal-air battery.

SUMMARY

According to an exemplary embodiment, a metal-air battery includes a negative electrode metal layer, a negative electrode electrolyte layer disposed on the negative electrode metal layer, a positive electrode layer disposed on the negative electrode electrolyte layer, the positive electrode layer comprising a positive electrode material which is capable of using oxygen as an active material, and a gas diffusion layer disposed on the positive electrode layer, wherein the negative electrode electrolyte layer is between the negative electrode metal layer and the positive electrode layer, wherein the negative electrode metal layer, the negative electrode electrolyte layer, and the positive electrode layer are disposed on the gas diffusion layer so that the positive electrode layer contacts a lower surface and an opposite upper surface of the gas diffusion layer, and wherein one side surface of the gas diffusion layer is exposed to an outside.

The gas diffusion layer may include a plurality of gas diffusion layers. The negative electrode metal layer, the negative electrode electrolyte layer, and the positive electrode layer may be repeatedly bent so that the positive electrode layer contacts lower and upper surfaces of the plurality of gas diffusion layers.

Between two adjacent gas diffusion layers, the negative electrode metal layer, the negative electrode electrolyte layer, and the positive electrode layer may be bent by 180 degrees so that the negative electrode metal layer is in a folded configuration and the positive electrode layer contacts the two adjacent gas diffusion layers.

The same side surfaces of the plurality of gas diffusion layers may be always exposed to the outside.

The metal-air battery may further include a negative electrode collector arranged to contact a bend portion of the bent negative electrode metal layer.

The negative electrode collector may extend in a direction perpendicular to a layer direction of the negative electrode metal layer, the negative electrode electrolyte layer, the positive electrode layer, and the gas diffusion layer.

A ratio of a weight of the negative electrode collector to the total weight of the metal-air battery may be smaller than, for example, about 10%.

The metal-air battery may further include an outer casing that surrounds surfaces of the negative electrode metal layer, the negative electrode electrolyte layer, the positive electrode layer, and the gas diffusion layers except for the exposed side surfaces of the gas diffusion layer.

The negative electrode collector may be positioned between the negative electrode metal layer and the outer casing in the outer casing.

An end of the exposed side surface of the gas diffusion layer may protrude from the negative electrode metal layer, the negative electrode electrolyte layer, and the positive electrode layer.

The metal-air battery may further include a positive electrode collector connected to the protruding end of the gas diffusion layer.

The negative electrode electrolyte layer may include a separation layer which is ionically conductive and is substantially impermeable to oxygen, and an electrolyte for transmitting the metal ions.

The separation layer may include a porous layer and pores of the porous layer may be impregnated with the electrolyte.

According to another exemplary embodiment, a metal-air battery includes: a negative electrode metal layer, a negative electrode electrolyte layer disposed on the negative electrode metal layer, a first positive electrode layer disposed on a first portion of the negative electrode electrolyte layer, the positive electrode layer comprising a positive electrode material which is capable of using oxygen as an active material, a gas diffusion layer disposed on the first positive electrode layer, and a second positive electrode layer disposed on the gas diffusion layer and opposite the first positive electrode layer, wherein a first portion of the negative electrode electrolyte layer is between the first positive electrode layer and a first portion of the negative electrode metal layer, and a second portion of the negative electrode electrolyte layer is between the second positive electrode layer and a second portion of the negative electrode electrolyte layer, wherein the negative electrode metal layer and the negative electrode electrolyte layer are disposed on the first and second positive electrode layers so that the negative electrode electrolyte layer contacts a lower surface of the first positive electrode layer and an upper surface of the second positive electrode layer, and wherein one side surface of the gas diffusion layer is exposed to the outside.

Lower and upper surfaces of the gas diffusion layer may be coated with the first and second positive electrode layers, respectively.

The gas diffusion layer may include a plurality of gas diffusion layers whose lower and upper surfaces are coated with the first and second positive electrode layers, respectively. The negative electrode metal layer and the negative electrode electrolyte layer may be repeatedly bent so that the negative electrode electrolyte layer contacts the first positive electrode layer and the second positive electrode layer.

Between two adjacent gas diffusion layers, the negative electrode metal layer and the negative electrode electrolyte layer may be bent by 180 degrees so that the negative electrode metal layer is in a folded configuration and the negative electrode electrolyte layer contacts the first positive electrode layer and the second positive electrode layer.

According to another exemplary embodiment, a method of manufacturing a metal-air battery includes: disposing a negative electrode electrolyte layer on a negative electrode metal layer, disposing a positive electrode layer which is capable of using oxygen as an active material on the negative electrode electrolyte layer, disposing a gas diffusion layer on the positive electrode layer, and bending the negative electrode metal layer, the negative electrode electrolyte layer, and the positive electrode layer on the gas diffusion layer so that the positive electrode layer contacts a lower surface and an opposite upper surface of the gas diffusion layer, wherein one side surface of the gas diffusion layer is exposed to the outside.

The method may further include bending the negative electrode metal layer, the negative electrode electrolyte layer, and the positive electrode layer by 180 degrees so that the negative electrode metal layer is folded and the positive electrode layer is exposed upward, partially arranging an additional gas diffusion layer on the positive electrode layer, and bending the negative electrode metal layer, the negative electrode electrolyte layer, and the positive electrode layer on the additional gas diffusion layer so that the positive electrode layer contacts an upper surface of the additional gas diffusion layer.

According to another exemplary embodiment, a method of manufacturing a metal-air battery may include arranging a negative electrode electrolyte layer on a negative electrode metal layer, providing a gas diffusion layer whose lower and upper surfaces are coated with a first positive electrode layer and a second positive electrode layer, respectively; partially arranging the gas diffusion layer on the negative electrode electrolyte layer so that the first positive electrode layer on the lower surface of the gas diffusion layer contacts the negative electrode electrolyte layer, and bending the negative electrode metal layer and the negative electrode electrolyte layer on the gas diffusion layer so that the negative electrode electrolyte layer contacts the second positive electrode layer on the upper surface of the gas diffusion layer, wherein one side surface of the gas diffusion layer may be exposed to the outside.

The method of manufacturing a metal-air battery may further include bending the negative electrode metal layer and the negative electrode electrolyte layer by 180 degrees so that the negative electrode metal layer is folded and the negative electrode electrolyte layer is exposed upward, partially arranging an additional gas diffusion layer whose lower and upper surfaces are coated with the first positive electrode layer and the second positive electrode layer, respectively, on the negative electrode electrolyte layer, and bending the negative electrode metal layer and the negative electrode electrolyte layer on the additional gas diffusion layer so that the negative electrode electrolyte layer contacts the second positive electrode layer on the upper surface of the additional gas diffusion layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
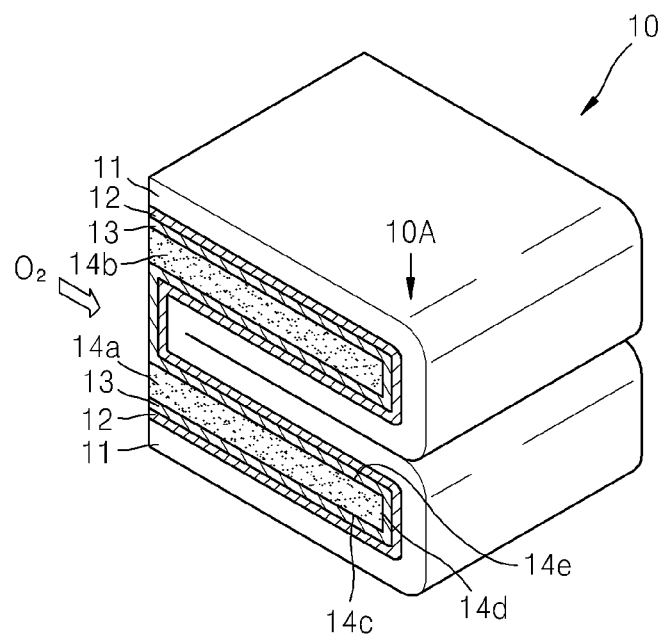
FIG. 1 is a perspective view schematically illustrating a structure of an embodiment of a metal-air battery having a folded structure.

A metal-air battery having a folded structure and a method of manufacturing the same now will be described more fully hereinafter with reference to the accompanying drawings, in which elements of the inventive concept are shown. The inventive concept may, however, be embodied in many different forms and should not be construed as limited to the exemplary embodiments set forth herein. Rather, these embodiments are provided so that this disclosure will be thorough and complete, and will fully convey the scope of the disclosure to one of ordinary skill in the art. In the drawings, the thickness of layers and regions are exaggerated for clarity.

It will also be understood that when a layer is referred to as being "on" another layer or substrate, it can be directly on the other layer or substrate, or intervening layers may also be present therebetween. In contrast, when an element is referred to as being "directly on" another element, there are no intervening elements present. The same reference numerals in different drawings represent the same element.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a perspective view schematically illustrating a structure of an embodiment of a metal-air battery 10 having a folded structure. Referring to FIG. 1, the metal-air battery 10 may include a negative electrode metal layer 11, a negative electrode electrolyte layer 12, a positive electrode layer 13, and at least one gas diffusion layer, for example, first and second gas diffusion layers 14a and 14b. Here, the negative electrode metal layer 11, the negative electrode electrolyte layer 12, and the positive electrode layer 13 are bent to surround three surfaces of the first and second gas diffusion layers 14a and 14b, for example the lower 14c, inner 14d, and upper 14e surfaces of each of the first and second gas diffusion layers. For example, after partially disposing, e.g., arranging, the first gas diffusion layer 14a on the positive electrode layer 13, the negative electrode metal layer 11, the negative electrode electrolyte layer 12, and the positive electrode layer 13 may be bent on the first gas diffusion layer 14a so that the positive electrode layer 13 contacts an upper surface and a lower surface of the first gas diffusion layer 14a.

Then, after the negative electrode metal layer 11, the negative electrode electrolyte layer 12, and the positive electrode layer 13 are reversely folded by 180 degrees so that the positive electrode layer 13 faces upward, the second gas diffusion layer 14b may be further disposed on the positive electrode layer 13. The negative electrode metal layer 11, the negative electrode electrolyte layer 12, and the positive electrode layer 13 may then be bent on the second gas diffusion layer 14b so that the positive electrode layer 13 contacts an upper surface and a lower surface of the second gas diffusion layer 14b. In the metal-air battery 10 illustrated in FIG. 1, only the negative electrode metal layer 11 is shown on the right-hand side of the metal-air battery 10, and the negative electrode electrolyte layer 12, the positive electrode layer 13, and the first and second gas diffusion layers 14a and 14b may be exposed on the left-hand side of the metal-air battery 10. Therefore, oxygen, which is used for the oxidation and reduction reactions in the positive electrode layer 13, may be absorbed from the left-hand side of the first and second gas diffusion layers 14a and 14b in the orientation of FIG. 1 so that oxygen is supplied to an entire region of the positive electrode layer 13.

In FIG. 1, in order to facilitate understanding of the folded structure of the metal-air battery 10 according to the present embodiment, the two gas diffusion layers, namely, the first and second gas diffusion layers 14a and 14b, are illustrated.

However, any number of repeat units may be used. The metal-air battery 10 illustrated in FIG. 1 includes two folded-type cells.

Figure 2:
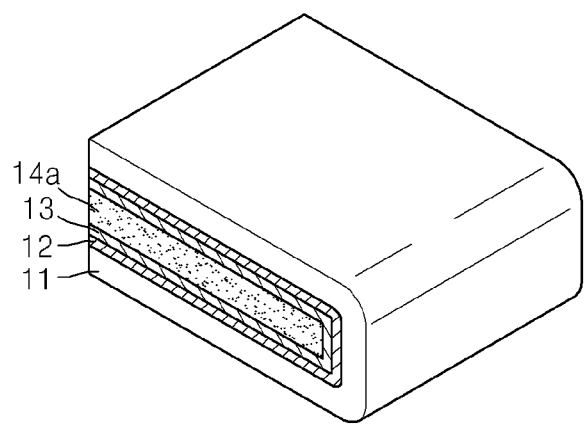
FIG. 2 is a perspective view schematically illustrating a structure of a single cell metal-air battery.

Shown in FIG. 2 is a metal-air battery comprising a single unit. In the metal air battery of FIG. 2, three surfaces of the first gas diffusion layer 14a are surrounded by the negative electrode metal layer 11, the negative electrode electrolyte layer 12, and the positive electrode layer 13, as illustrated in FIG. 2. Therefore, it may be considered that the metal-air battery 10 illustrated in FIG. 1 includes two folded-type cells.

Figure 3A:
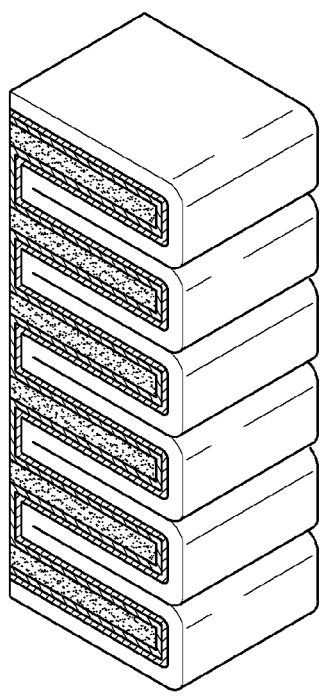
FIG. 3A is a perspective view schematically illustrating a structure of an embodiment of a metal-air battery having a folded structure in which the number of cells is increased.

As described above, a process of arranging the first and second gas diffusion layers 14a and 14b on the positive electrode layer 13 and bending the negative electrode metal layer 11, the negative electrode electrolyte layer 12, and the positive electrode layer 13 may be repeated to increase the number of cells of the metal-air battery 10. For example, FIG. 3A is a perspective view schematically illustrating a structure in which the number of cells is increased. Although the process of disposing the first and second gas diffusion layers 14a and 14b on the positive electrode layer 13 and bending the negative electrode metal layer 11, the negative electrode electrolyte layer 12, and the positive electrode layer 13 is repeated so that the number of cells is increased, as illustrated in FIG. 3A, portions of the first and second gas diffusion layers 14a and 14b are always exposed to the outside. For example, in FIG. 3A, the portion of the surfaces of the first and second gas diffusion layers 14a and 14b shown at the front of the battery, e.g., the side including the bend 10A, are covered with an outer casing 16 when the metal-air battery 10 is wrapped by the outer casing 16 (refer to FIG. 5), however, the surface on the left side of the first and second gas diffusion layers 14a and 14b may be always exposed to the outside although the metal-air battery 10 is partially wrapped by the outer casing 16. Therefore, according to the present embodiment, in the metal-air battery 10, oxygen may be easily supplied to the positive electrode layer 13 regardless of the increase in the number of cells.

Figure 3B:
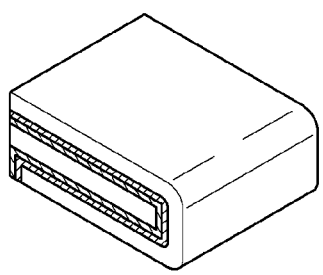
FIG. 3B is a perspective view schematically illustrating a structure of an end cell of the metal-air battery of FIG. 3A.
Figure 3C:
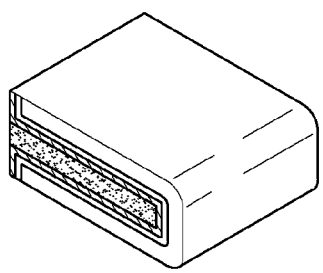
FIG. 3C is a perspective view schematically illustrating a structure of a unit middle cell of the metal-air battery of FIG. 3A.
Figure 4:
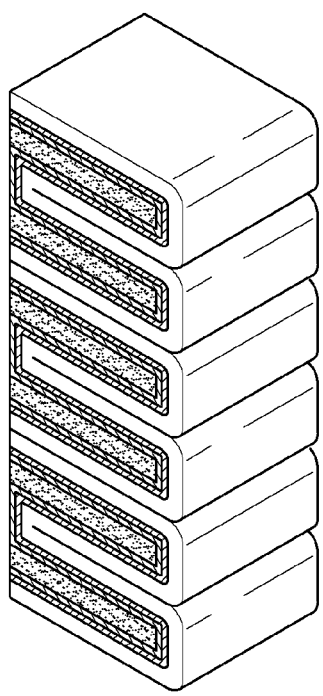
FIG. 4 is a perspective view schematically illustrating a structure of another embodiment of a metal-air battery having a folded structure in which the number of cells is increased.

In FIG. 3A, an example, in which the process of windingly bending the negative electrode metal layer 11, the negative electrode electrolyte layer 12, and the positive electrode layer 13 is repeated a plurality of times to increase the number of cells, is illustrated. The metal air battery may comprise an end cell as shown in FIG. 3B on either end of the structure, and a plurality of middle cells as shown in FIG. 3C between the end cells. The number of cells may be increased by another method. For example, as illustrated in FIG. 4, the metal-air battery 10 having two cells, which is illustrated in FIG. 1, may be stacked a plurality of times to increase the number of cells. In addition, the metal-air battery 10 having one cell, which is illustrated in FIG. 2, may be stacked a plurality of times to increase the number of cells.

Figure 5:
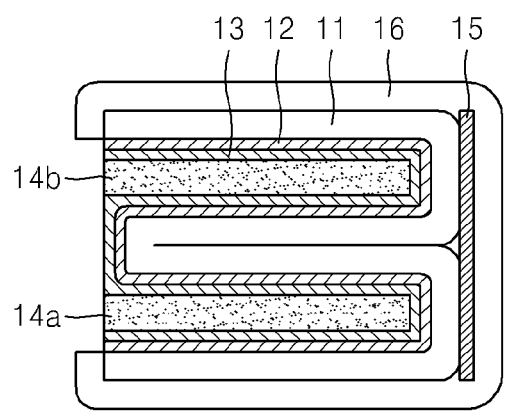
FIG. 5 is a cross-sectional view schematically illustrating a state in which an embodiment of a negative electrode collector and an outer casing are further disposed on the metal-air battery of FIG. 1.

FIG. 5 is a cross-sectional view schematically illustrating a configuration which a negative electrode collector 15 and an outer casing 16 are further disposed on the metal-air battery 10 of FIG. 1. Referring to FIG. 5, the negative electrode collector 15 is arranged on a right-hand region of the metal-air battery 10, where the negative electrode metal layer 11 is bent, such that the negative electrode collector 15 contacts a bend 51 of the negative electrode metal layer 11. The negative electrode collector 15 may comprise a conductive metal such as copper (Cu), and may be in the form of a thin film or layer of the conductive metal. As illustrated in FIG. 5, the negative electrode collector 15 may extend in a direction perpendicular to a layer direction, i.e., a major surface, of the negative electrode metal layer 11, the negative electrode electrolyte layer 12, the positive electrode layer 13, and/or the first and second gas diffusion layers 14a and 14b. Since the negative electrode collector 15 flatly extends in a vertical direction without being bent regardless of the number of cells, an amount of material of the negative electrode collector 15 may be reduced and a ratio of a weight of the negative electrode collector 15 to a weight of the metal-air battery 10 may be reduced. For example, a ratio of a weight of the negative electrode collector 15 to the total weight of the metal-air battery 10 excluding the outer casing 16 may be no more than about 10% or about 5%, for example about 1% to about 10%, or about 2% to about 5%, based on a total weight of the metal-air battery.

A lower surface, a right-hand surface, and an upper surface of the metal-air battery 10 may be surrounded by the outer casing 16, which may be in the form of a pouch, and may comprise a film material. Although not shown in FIG. 5, front and rear surfaces of the metal-air battery 10 may be also surrounded by the outer casing 16. That is, five surfaces of the metal-air battery 10 may be surrounded by the outer casing 16, and a sixth, e.g. left-hand side surface 52, maybe exposed. That is, surfaces of the negative electrode metal layer 11, the negative electrode electrolyte layer 12, the positive electrode layer 13, and the first and second gas diffusion layers 14a and 14b, excluding the exposed side surfaces of the first and second gas diffusion layers 14a and 14b, may be surrounded by the outer casing 16. When the metal-air battery 10 is surrounded by the outer casing 16, the negative electrode collector 15 is positioned between the negative electrode metal layer 11 and the outer casing 16 and in the outer casing 16. Since the left side surface of the metal-air battery 10 is not surrounded by the outer casing 16, the first and second gas diffusion layers 14a and 14b may be exposed to the outside on the left of the metal-air battery 10.

Figure 6:
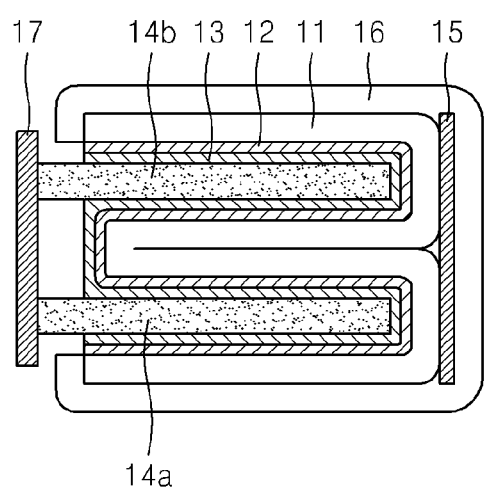
FIG. 6 is a cross-sectional view schematically illustrating a structure of another embodiment of a metal-air battery.

FIG. 6 is a cross-sectional view schematically illustrating a structure of another embodiment of a metal-air battery 10. In the above-described embodiment, exposed left ends of the first and second gas diffusion layers 14a and 14b are formed to coincide with left surfaces of the negative electrode metal layer 11, the negative electrode electrolyte layer 12, and the positive electrode layer 13. However, as illustrated in FIG. 6, the first and second gas diffusion layers 14a and 14b may be formed so that the exposed left ends thereof protrude from the left surfaces of the negative electrode metal layer 11, the negative electrode electrolyte layer 12, and the positive electrode layer 13. Therefore, a larger area of the first and second gas diffusion layers 14a and 14b contacts external air so that oxygen may be more smoothly supplied to the positive electrode layer 13. In addition, as illustrated in FIG. 6, a positive electrode collector 17 is connected to the protruding ends of the first and second gas diffusion layers 14a and 14b so that current may be easily output from the positive electrode layer 13.

Figure 7:
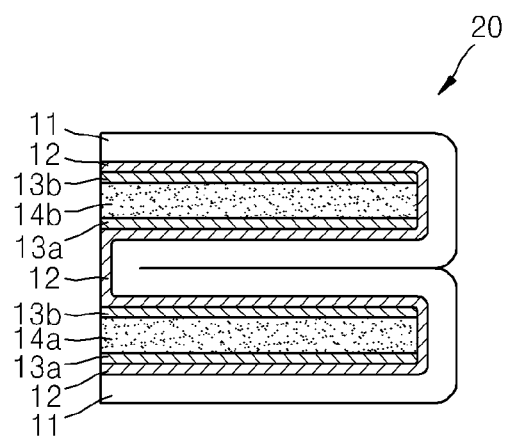
FIG. 7 is a cross-sectional view schematically illustrating a structure of another embodiment of a metal-air battery.

FIG. 7 is a cross-sectional view schematically illustrating a structure of a metal-air battery 20 according to another embodiment. In the above-described embodiment, the first and second gas diffusion layers 14a and 14b are separately formed from the positive electrode layer 13 so that the negative electrode metal layer 11, the negative electrode electrolyte layer 12, and the positive electrode layer 13 are bent to surround the three surfaces of the first and second gas diffusion layers 14a and 14b. However, in the embodiment illustrated in FIG. 7, the first and second gas diffusion layers 14a and 14b and first and second positive electrode layers 13a and 13b may be integrally formed. For example, lower surfaces of the first and second gas diffusion layers 14a and 14b may be coated with the first positive electrode layer 13a, and upper surfaces of the first and second gas diffusion layers 14a and 14b may be coated with the second positive electrode layer 13b. In this case, as illustrated in FIG. 7, the negative electrode metal layer 11 and the negative electrode electrolyte layer 12 are bent to surround a lower surface of the first positive electrode layer 13a and an upper surface of the second positive electrode layer 13b. For example, after the first gas diffusion layer 14a coated with the first positive electrode layer 13a and the second positive electrode layer 13b is partially disposed on the negative electrode electrolyte layer 12, the negative electrode metal layer 11 and the negative electrode electrolyte layer 12 may be disposed, e.g., bent on the second positive electrode layer 13b so that the negative electrode electrolyte layer 12 contacts the upper surface of the second positive electrode layer 13b.

Then, after the negative electrode metal layer 11 and the negative electrode electrolyte layer 12 are reversely folded by 180 degrees so that the negative electrode electrolyte layer 12 faces upward, the second gas diffusion layer 14b may be further disposed on the negative electrode electrolyte layer 12. The lower and upper surfaces of the second gas diffusion layer 14b are contacted, e.g., coated, with the first and second positive electrode layers 13a and 13b, respectively, so that the first positive electrode layer 13a contacts the negative electrode electrolyte layer 12. The negative electrode metal layer 11 and the negative electrode electrolyte layer 12 may be disposed, e.g., bent, on the second positive electrode layer 13b so that the negative electrode electrolyte layer 12 contacts the second positive electrode layer 13b on the upper surface of the second gas diffusion layer 14b.

FIGS. 8A to 8E are cross-sectional views schematically illustrating processes of manufacturing the metal-air battery 10 of FIG. 1. FIGS. 9A to 9C are cross-sectional views schematically illustrating processes of manufacturing the metal-air battery 20 of FIG. 7. Hereinafter, methods of manufacturing the above-described metal-air batteries 10 and 20 will be described in further detail with reference to FIGS. 8A to 9C.

Figure 8A:
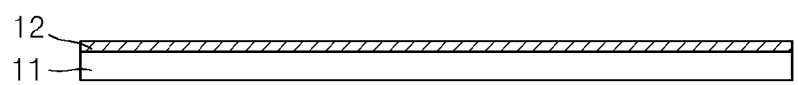
FIGS. 8A to 8E are cross-sectional views schematically illustrating an embodiment of a process of manufacturing the metal-air battery of FIG. 1.
Figure 9A:
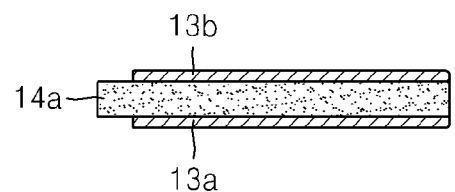
FIGS. 9A to 9C are cross-sectional views schematically illustrating an embodiment of a process of manufacturing the metal-air battery of FIG. 7.
Figure 9B:
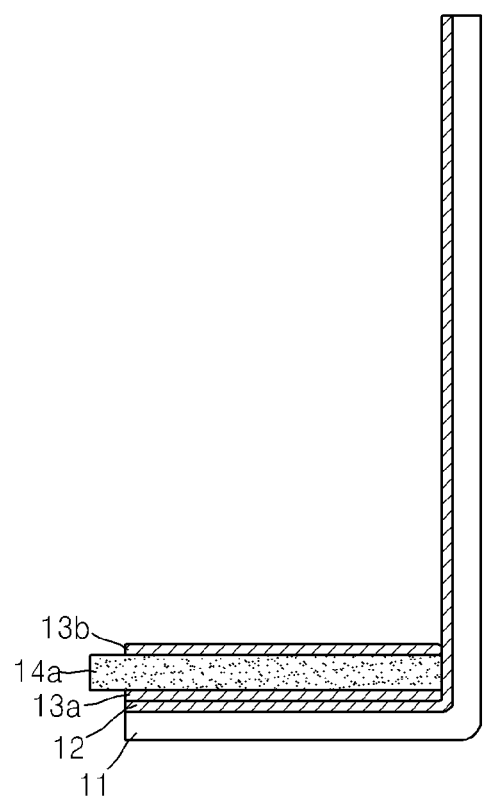
Figure 9C:
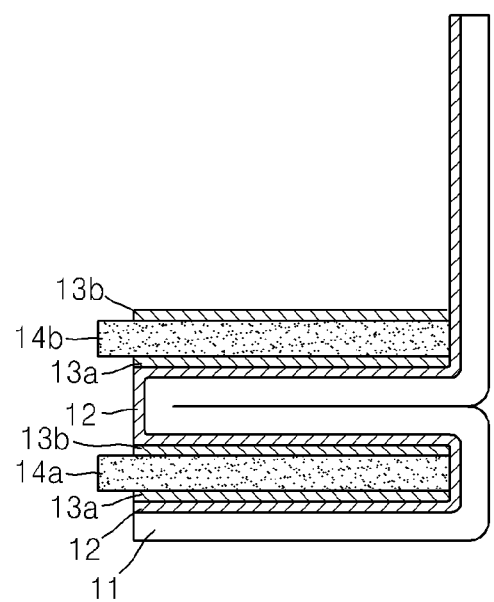

First, referring to FIG. 8A, the negative electrode electrolyte layer 12 is disposed, e.g., attached, onto the negative electrode metal layer 11. The negative electrode metal layer 11 and the negative electrode electrolyte layer 12 may be separately formed and attached to each other or the negative electrode electrolyte layer 12 may be directly formed on the negative electrode metal layer 11.

The negative electrode metal layer 11 for occluding and emitting metal ions may comprise lithium (Li), sodium (Na), zinc (Zn), potassium (K), calcium (Ca), magnesium (Mg), iron (Fe), aluminum (Al), an alloy of the foregoing, or combination thereof.

The negative electrode electrolyte layer 12 transports the metal ions to the positive electrode layer 13. To do so, the negative electrode electrolyte layer 12 may include an electrolyte comprising a salt and a solvent, for example electrolyte formed by dissolving a metal salt in a solvent. In an embodiment, the electrolyte may be in a solid phase and may comprise a polymer-based electrolyte, an inorganic-based electrolyte, or a composite electrolyte, such as an electrolyte obtained by mixing the polymer-based electrolyte and the inorganic-based electrolyte. The electrolyte may be manufactured to be flexible to facilitate subsequent processes. The metal salt may comprise, for example, a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, lithium bis(trifluoromethanesulfonyl)imide ("LiTFSI"), or combination thereof. Also, another metal salt such as $AlCl_3$, $MgCl_2$, NaCl, KCl, NaBr, KBr, $CaCl_2$, or combination thereof may be added to the above-described lithium salt. Any suitable material that may dissolve the lithium salt and the metal salt may be used as the solvent. Representative solvents include ethylene carbonate, butylene carbonate, dimethyl carbonate, methyl ethyl carbonate, diethyl carbonate, γ-butyrolactone, methyl propionic acid, butyl propionic acid, ethyl propionic acid, or a combination thereof.

In addition, the negative electrode electrolyte layer 12 may further include a separation layer (not shown) having suitable conductivity for the metal ions while substantially or effectively preventing transmission of oxygen. The separation layer may use a flexible polymer-based separation layer. For example, the separation layer may comprise a polymeric non-woven fabric such as a non-woven fabric comprising polypropylene or a non-woven fabric of polyphenylene sulfide and a porous layer, e.g., film, of olefin-based resin such as polyethylene or polypropylene. The separation layer and the electrolyte may comprise separate layers. However, the negative electrode electrolyte layer 12 may comprise a single layer by impregnating pores of the porous separation layer with the electrolyte. For example, the pores of the porous separation layer may be impregnated with the electrolyte, which may be formed by mixing polyethylene oxide ("PEO") and LiTFSI so that the negative electrode electrolyte layer 12 may be formed.

Figure 8B:
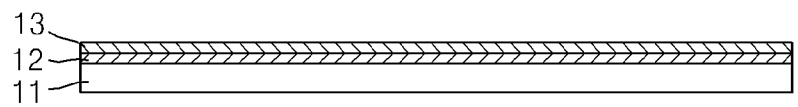

Next, as illustrated in FIG. 8B, the positive electrode layer 13 is disposed, e.g., coated, on the negative electrode electrolyte layer 12. The positive electrode layer 13 may include the electrolyte for conducting the metal ions, a catalyst for oxidation and reduction of oxygen, a conductive material, and a binder. For example, after mixing the above-described electrolyte, catalyst, conductive material, and binder, a solvent may be added to manufacture a positive electrode slurry, and the manufactured positive electrode slurry may be coated on the negative electrode electrolyte layer 12 and dried so that the positive electrode layer 13 may be formed.

Here, the electrolyte may include the above-described lithium salt and/or the metal salt. A porous carbon-based material, a conductive metal material, a conductive organic material, or a combination of the above may be used as the conductive material. For example, carbon black, graphite, graphene, activated carbon, carbon fabric, and carbon nanotubes may be used as the carbon-based material. The conductive metal material may be used in the form of metal powder. Platinum (Pt), gold (Au), and silver (Ag) or an oxide of manganese (Mn), nickel (Ni), and cobalt (Co) may be used as the catalyst. In addition, polytetrafluoroethylene ("PTFE"), polypropylene, polyvinylidene fluoride ("PVDF"), polyethylene, styrene-butadiene rubber, or combination thereof, may be used as the binder.

Figure 8C:
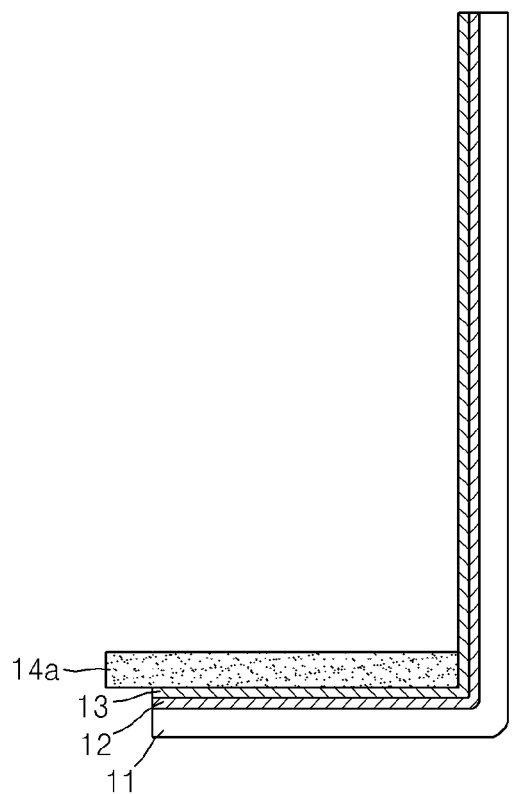

As illustrated in FIG. 8C, the first gas diffusion layer 14a is partially disposed on the positive electrode layer 13. Here, the first gas diffusion layer 14a absorbs oxygen in the air to supply the absorbed oxygen to the positive electrode layer 13. To do so, the first gas diffusion layer 14a may have a porous structure so that external oxygen may be smoothly diffused. For example, the first gas diffusion layer 14a may comprise a carbon paper such as a carbon fabric, carbon cloth, or carbon felt, a metal foam such as a metal from having a sponge-shape, or metal fabric mat.

After the first gas diffusion layer 14a is disposed on the positive electrode layer 13, the negative electrode metal layer 11, the negative electrode electrolyte layer 12, and the positive electrode layer 13 are vertically bent so that the positive electrode layer 13 may contact one side surface of the first gas diffusion layer 14*a* without a gap. For example, remaining parts of the negative electrode metal layer 11, the negative electrode electrolyte layer 12, and the positive electrode layer 13 that are not covered with the first gas diffusion layer 14*a* may be bent to be vertically erected.

Figure 8D:
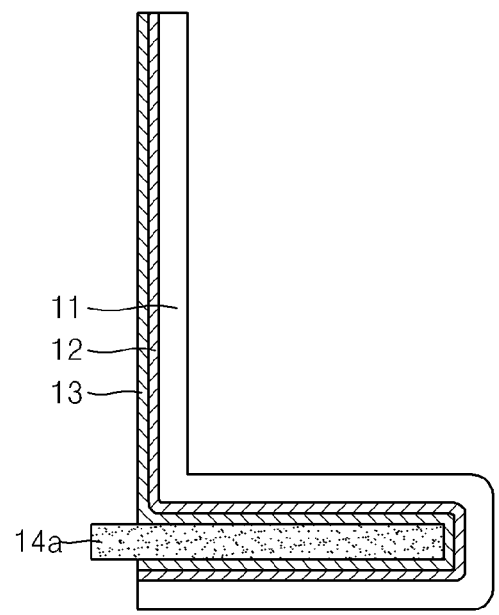

Then, as illustrated in FIG. 8D, the erected negative electrode metal layer 11, negative electrode electrolyte layer 12, and positive electrode layer 13 are bent on the upper surface of the first gas diffusion layer 14*a* so that the positive electrode layer 13 may contact the upper surface of the first gas diffusion layer 14*a* without a gap. At positions that coincide with the ends of the negative electrode metal layer 11, the negative electrode electrolyte layer 12, and the positive electrode layer 13 under the first gas diffusion layer 14*a*, the negative electrode metal layer 11, the negative electrode electrolyte layer 12, and the positive electrode layer 13 on the first gas diffusion layer 14*a* may be vertically erected again.

Figure 8E:
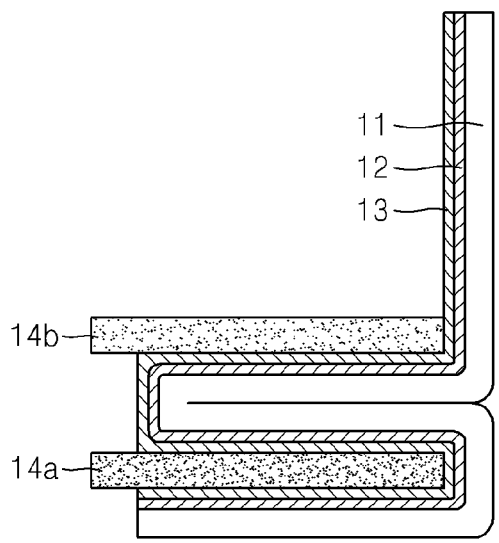

Finally, referring to FIG. 8E, the vertically erected negative electrode metal layer 11, negative electrode electrolyte layer 12, and positive electrode layer 13 are reversely bent by 180 degrees. Then, the negative electrode metal layer 11 is folded in a serpentine configuration to be stacked and the positive electrode layer 13 is exposed upward. Then, the second gas diffusion layer 14*b* may be further disposed on the exposed positive electrode layer 13. Then, as illustrated in FIGS. 8C and 8D, the negative electrode metal layer 11, the negative electrode electrolyte layer 12, and the positive electrode layer 13 may be dispose, e.g., bent, on the second gas diffusion layer 14*b*.

In FIGS. 8A to 8E, it is illustrated that the metal-air battery 10 includes two gas diffusion layers, namely, the first and second gas diffusion layers 14*a* and 14*b*. However, the present embodiment is not limited to the foregoing. The metal-air battery 10 may comprise only one of the first and second gas diffusion layers 14*a* and 14*b* if desired or may comprise three or more gas diffusion layers. After repeating the processes illustrated in FIGS. 8A to 8E in accordance with the number of desired gas diffusion layers 14*a* and 14*b*, the negative electrode metal layer 11, the negative electrode electrolyte layer 12, and the positive electrode layer 13 that are left after covering the upper surface of the uppermost gas diffusion layer are cut off so that the metal-air battery 10 may be completed. For example, the negative electrode metal layer 11, the negative electrode electrolyte layer 12, and the positive electrode layer 13 may be repeatedly bent so that the positive electrode layer 13 contacts the lower and upper surfaces of the plurality of gas diffusion layers, for example, the first and second gas diffusion layers 14*a* and 14*b*. Here, between the two adjacent first and second gas diffusion layers 14*a* and 14*b*, the negative electrode metal layer 11, the negative electrode electrolyte layer 12, and the positive electrode layer 13 are bent by 180 degrees so that the negative electrode metal layer 11 is folded in a serpentine configuration to be stacked and the positive electrode layer 13 contacts the two first and second gas diffusion layers 14*a* and 14*b*. Then, the same side surfaces of the plurality of gas diffusion layers, for example, the first and second gas diffusion layers 14*a* and 14*b*, may be exposed to the outside.

In an embodiment, in order to manufacture the metal-air battery 20 illustrated in FIG. 7, first, as illustrated in FIG. 8A, the negative electrode electrolyte layer 12 is disposed on, e.g., attached onto, the negative electrode metal layer 11. Then, as illustrated in FIG. 9A, the first gas diffusion layer 14*a* coated with the first and second positive electrode layers 13*a* and 13*b* is provided. For example, the positive electrode slurry manufactured by mixing the above-described electrolyte, catalyst, conductive material, and binder and then, adding the solvent is coated on the lower and upper surfaces of the first gas diffusion layer 14*a* and dried so that the first and second positive electrode layers 13*a* and 13*b* may be formed. Providing the negative electrode metal layer 11, onto which the negative electrode electrolyte layer 12 is disposed, and providing the first gas diffusion layer 14*a* coated with the first and second positive electrode layers 13*a* and 13*b* need not be sequentially performed.

As illustrated in FIG. 9B, the first gas diffusion layer 14*a* is partially dispose, e.g., arranged on, the negative electrode electrolyte layer 12. Then, the first positive electrode layer 13*a* on the lower surface of the first gas diffusion layer 14*a* contacts the negative electrode electrolyte layer 12. Then, the negative electrode metal layer 11 and the negative electrode electrolyte layer 12 are vertically bent so that the negative electrode electrolyte layer 12 may contact one side surface of the first gas diffusion layer 14*a* without a gap. That is, the remaining portions of the negative electrode metal layer 11 and the negative electrode electrolyte layer 12 that are not covered with the first gas diffusion layer 14*a* may be bent to be vertically erected.

Referring to FIG. 9C, the vertically erected negative electrode metal layer 11 and negative electrode electrolyte layer 12 are bent on the upper surface of the first gas diffusion layer 14*a* so that the negative electrode electrolyte layer 12 may contact the second positive electrode layer 13*b* on the upper surface of the first gas diffusion layer 14*a* without a gap. Then, in positions that coincide with the ends of the negative electrode metal layer 11 and the negative electrode electrolyte layer 12 under the first gas diffusion layer 14*a*, the negative electrode metal layer 11 and the negative electrode electrolyte layer 12 on the first gas diffusion layer 14*a* are vertically erected again and then, the vertically erected negative electrode metal layer 11 and negative electrode electrolyte layer 12 are reversely folded by 180 degrees. Then, the negative electrode metal layer 11 is folded in a serpentine configuration to be stacked and the negative electrode electrolyte layer 12 is exposed upward.

Then, the second gas diffusion layer 14*b* may be further disposed on the exposed negative electrode electrolyte layer 12. The lower and upper surfaces of the second gas diffusion layer 14*b* are contacted with, e.g., coated with, the first and second positive electrode layers 13*a* and 13*b*. Then, as described above, the negative electrode metal layer 11 and the negative electrode electrolyte layer 12 may be bent on the second gas diffusion layer 14*b*. After repeating the processes illustrated in FIGS. 9B and 9C in accordance with the number of required gas diffusion layers, namely, the first and second gas diffusion layers 14*a* and 14*b*, the negative electrode metal layer 11 and the negative electrode electrolyte layer 12 that are left after covering the upper surface of the uppermost gas diffusion layer are cut off so that the metal-air battery 20 may be completed. For example, the negative electrode metal layer 11 and the negative electrode electrolyte layer 12 may be repeatedly bent so that the negative electrode electrolyte layer 12 contacts the first and second positive electrode layers 13*a* and 13*b* arranged on the lower and upper surfaces of the plurality of gas diffusion layers, namely, the first and second gas diffusion layers 14*a* and 14*b*. Here, between the two adjacent first and second gas diffusion layers 14*a* and 14*b*, the negative electrode metal layer 11 and the negative electrode electrolyte layer 12 are bent by 180 degrees so that the negative electrode metal layer 11 is folded in a serpentine configuration to be stacked and the negative electrode electrolyte layer 12 contacts the first and second positive electrode layers 13a and 13b. Then, the same side surfaces of the plurality of gas diffusion layers, namely, the first and second gas diffusion layers 14a and 14b, may be exposed to the outside.

Figure 10:
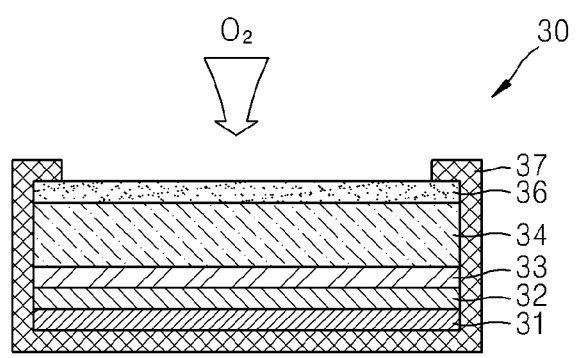
FIG. 10 is a cross-sectional view schematically illustrating a structure of a metal-air battery in the form of a two-dimensional cell according to a Comparative Example.
Figure 11:
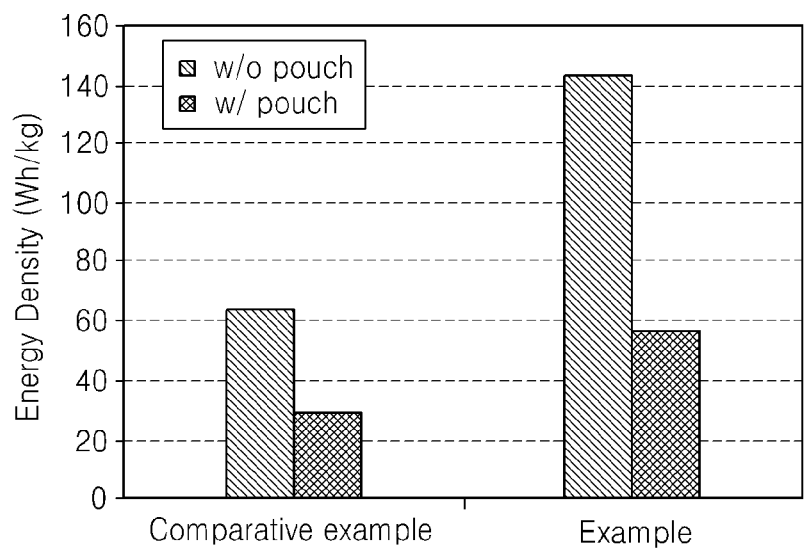
FIG. 11 is a graph of energy density (watt-hours per kilogram (Wh/kg)) of the metal-air battery of the Example and Comparative Example.
Figure 12:
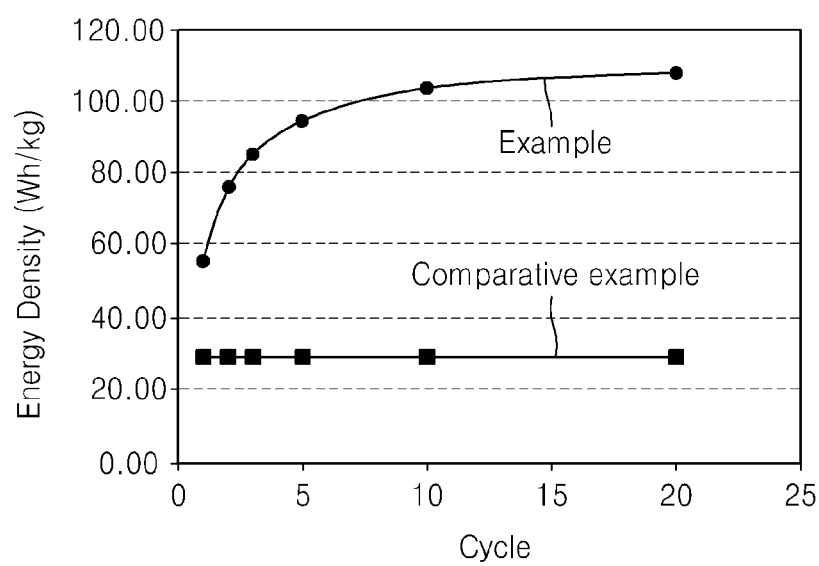
FIG. 12 is a graph of energy density (Wh/kg) versus cycle number illustrating the energy density of the metal-air battery of FIG. 1.

As is further disclosed above, in the metal-air batteries 10 and 20 according to the present embodiment, a ratio of the weight of the negative electrode collector 15 to the total weight of the metal-air batteries 10 and 20, excluding the outer casing 16, is small. Therefore, energy density (Wh/kg) of the metal-air batteries 10 and 20 according to the present embodiment may be remarkably increased. For example, FIGS. 11 and 12 are graphs illustrating energy density of the metal-air battery 10 of FIG. 1 in comparison with a Comparative Example, and FIG. 10 is a cross-sectional view schematically illustrating a structure of a metal-air battery 30 in the form of a two-dimensional cell according to the Comparative Example used in the graphs of FIGS. 11 and 12. In the graphs of FIGS. 11 and 12, a reaction area of the metal-air battery 10 according to the Example and that of the metal-air battery 30 according to the Comparative Example are each 4 cm$^2$.

Referring to FIG. 10, the metal-air battery 30 in the form of a two-dimensional cell according to the Comparative Example may include a negative electrode metal layer 31, a negative electrode electrolyte layer 32, a separation layer 33 having suitable conductivity for metal ions while substantially or effectively preventing transmission of oxygen, a positive electrode layer 34, a gas diffusion layer 36, and an outer casing 37 that surrounds remaining portions of the metal-air battery 30 excluding the gas diffusion layer 36. In the metal-air battery 30 in the form of a two-dimensional cell, when a plurality cells are vertically stacked, oxygen may not be smoothly supplied to lower cells. In addition, since a ratio of a weight of a collector (not shown) for outputting current to the total weight of the metal-air battery 30 is almost 50%, a ratio of the sum of the weights of the negative electrode metal layer 11, the negative electrode electrolyte layer 12, and the positive electrode layer 13 that contribute to the energy density to the total weight of the metal-air battery 30 is small. For example, in the metal air battery 30 according to the Comparative Example, the ratio of the sum of the weights of the negative electrode metal layer 11, the negative electrode electrolyte layer 12, and the positive electrode layer 13 to the total weight of the metal-air battery 30 according to the comparative example may be less than about 35%. On the other hand, in the metal-air batteries 10 and 20 according to the present embodiment, since a ratio of the sum of the weights of the negative electrode metal layer 11, the negative electrode electrolyte layer 12, and the positive electrode layer 13 to the total weight of the metal-air battery may be almost about 80%, for example about 30% to about 80%, or about 40% to about 70%, energy density may be surprisingly increased.

For example, referring to the graph of FIG. 11, it is noted that, in both the energy density in the case where the outer casing is included and the energy density in the case where the outer casing is excluded, the energy density of the metal-air battery 10 according to the present embodiment is about twice greater than that of the metal-air battery 30 according to the Comparative Example. In addition, referring to the graph of FIG. 12, it is noted that, in the metal-air battery 30 according to the Comparative Example, the energy density is hardly changed although the number of cells is increased, on the other hand, in the metal-air battery 10 according to the present embodiment, the energy density is increased as the number of cells is increased. For example, when the number of cells is one, the energy density of the metal-air battery 10 according to the present embodiment is about twice greater than that of the metal-air battery 30 according to the Comparative Example. However, when the number of cells is 20, the energy density of the metal-air battery 10 according to the present embodiment is about three or more times greater than that of the metal-air battery 30 according to the Comparative Example.

It should be understood that the exemplary embodiments described herein should be considered in a descriptive sense only and not for purposes of limitation. Descriptions of features, advantages, or aspects within each embodiment should typically be considered as available for other similar features, advantages, or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A metal-air battery comprising:
   a first gas diffusion layer;
   a negative electrode metal layer bent so that the negative electrode metal layer is in a folded configuration and surrounds a lower surface, a first side surface, and an upper surface of the first gas diffusion layer;
   a negative electrode electrolyte layer disposed between the lower surface of the first gas diffusion layer and the negative electrode metal layer and between the upper surface of the first gas diffusion layer and the negative electrode metal layer; and
   a positive electrode layer disposed between the lower surface of the first gas diffusion layer and the negative electrode electrolyte layer and between the upper surface of the first gas diffusion layer and the negative electrode electrolyte layer,
   wherein a second side surface of the first gas diffusion layer is exposed to the outside.

2. The metal-air battery of claim 1, further comprising a second gas diffusion layer stacked over the upper surface of the first gas diffusion layer,
   wherein the negative electrode metal layer is further bent so that the negative electrode metal layer surrounds a lower surface, a first side surface, and an upper surface of the second gas diffusion layer,
   wherein the negative electrode electrolyte layer is further disposed between the lower surface of the second gas diffusion layer and the negative electrode metal layer and between the upper surface of the second gas diffusion layer and the negative electrode metal layer; and
   wherein the positive electrode layer is further disposed between the lower surface of the second gas diffusion layer and the negative electrode electrolyte layer and between the upper surface of the second gas diffusion layer and the negative electrode electrolyte layer, and
   wherein a second side surface of the second gas diffusion layer is exposed to the outside.

3. The metal-air battery of claim 2, wherein, the negative electrode metal layer is bent by 180 degrees between the upper surface of the first gas diffusion layer and the lower surface of the second gas diffusion layer so that the negative electrode metal layer is folded configuration.

4. The metal-air battery of claim 1, further comprising a negative electrode collector which contacts a bend portion of the negative electrode metal layer and extends in a direction perpendicular to a major surface of each of the negative electrode metal layer, the negative electrode electrolyte layer, the positive electrode layer, and the first gas diffusion layer.

5. The metal-air battery of claim 4, wherein a ratio of a weight of the negative electrode collector to a weight of the metal-air battery is no more than about 10%.

6. The metal-air battery of claim 5, further comprising an outer casing which surrounds surfaces of the negative electrode metal layer so that the metal-air battery is wrapped by the outer casing excluding the exposed second side surface of the first gas diffusion layer,
  wherein the negative electrode collector is disposed between the negative electrode metal layer and the outer casing.

7. The metal-air battery of claim 1, wherein an end of the exposed second side surface of the first gas diffusion layer protrudes from the negative electrode metal layer, the negative electrode electrolyte layer, and the positive electrode layer.

8. The metal-air battery of claim 7, further comprising a positive electrode collector connected to the protruding end of the second side surface of the first gas diffusion layer.

9. The metal-air battery of claim 1, wherein the negative electrode electrolyte layer comprises a solid electrolyte, the solid electrolyte comprising one of a polymer-based electrolyte, an inorganic-based electrolyte, and a composite electrolyte which is obtained by mixing the polymer-based electrolyte and the inorganic-based electrolyte.

10. The metal-air battery of claim 1, wherein the negative electrode electrolyte layer comprises a separation layer which is ionically conductive and substantially impermeable to oxygen, and an electrolyte.

11. The metal-air battery of claim 1, wherein the positive electrode layer comprises:
  a first positive electrode layer disposed between the lower surface of the first gas diffusion layer and the negative electrode electrolyte layer; and
  a second positive electrode layer disposed between the upper surface of the first gas diffusion layer and the negative electrode electrolyte layer,
  wherein the first positive electrode layer and the second positive electrode layer are separated from each other.

* * * * *